United States Patent
Parr

(10) Patent No.: US 8,146,469 B2
(45) Date of Patent: Apr. 3, 2012

(54) CONTAINER FOR PRODUCING PREDETERMINED FOOD PORTIONS

(76) Inventor: Becky Parr, Ann Arbor, MI (US)

( * ) Notice: Subject to any disclaimer, the term of this patent is extended or adjusted under 35 U.S.C. 154(b) by 43 days.

(21) Appl. No.: 12/518,714

(22) PCT Filed: Jan. 21, 2009

(86) PCT No.: PCT/US2009/031475
§ 371 (c)(1),
(2), (4) Date: Jun. 11, 2009

(87) PCT Pub. No.: WO2009/094347
PCT Pub. Date: Jul. 30, 2009

(65) Prior Publication Data
US 2010/0326250 A1    Dec. 30, 2010

Related U.S. Application Data

(60) Provisional application No. 61/022,430, filed on Jan. 21, 2008.

(51) Int. Cl.
*B26D 1/00* (2006.01)
*B26D 7/27* (2006.01)
*A01J 19/00* (2006.01)

(52) U.S. Cl. ........ 83/13; 83/522.26; 206/459.1; 30/114; 30/289; 30/313; 30/312; 426/518; 426/503

(58) Field of Classification Search ............... 83/13, 167, 83/932, 522.26, 761, 614, 763, 565, 823, 83/762; 30/114, 289, 304, 286, 293, 313, 30/317, 312; 426/518, 503; 206/459.1; 99/837, 99/DIG. 15, 515; D7/673, 672, 677
See application file for complete search history.

(56) References Cited

U.S. PATENT DOCUMENTS

| 892,552 A | 7/1908 | Rexer |
| 2,026,829 A | 1/1936 | Ellinger |
| 2,308,817 A * | 1/1943 | Leve ................................ 33/1 F |
| 2,434,566 A | 1/1948 | Hulsmann |
| 2,487,234 A | 11/1949 | Gore |
| 2,560,271 A * | 7/1951 | Block .............................. 33/1 F |
| 2,730,801 A | 1/1956 | Deedman et al. |
| 3,075,565 A | 1/1963 | Weaver et al. |
| 3,132,678 A | 5/1964 | Steketee |
| 3,178,929 A | 4/1965 | Goss |
| 3,771,713 A | 11/1973 | Davidson |
| 4,195,402 A * | 4/1980 | Leffer ............................ 30/114 |
| 4,648,300 A * | 3/1987 | Hassenfelt, Jr. ................ 83/762 |
| 5,533,269 A | 7/1996 | Pickens et al. |
| 6,009,786 A | 1/2000 | Hjelden |
| 6,123,972 A | 9/2000 | Matthews et al. |
| 6,164,478 A | 12/2000 | Cant |
| 6,220,133 B1 * | 4/2001 | Gosselin ........................... 83/13 |
| 6,238,907 B1 * | 5/2001 | Schuler-Maloney et al. ........................... 435/284.1 |
| 6,745,660 B2 | 6/2004 | Caputo |
| 7,269,867 B2 * | 9/2007 | Karlstedt ......................... 7/105 |

* cited by examiner

*Primary Examiner* — Ghassem Alie
(74) *Attorney, Agent, or Firm* — Fraser Clemens Martin & Miller LLC; J. Douglas Miller

(57) ABSTRACT

A container or pan for producing predetermined food portions is disclosed. Indicia are formed on the container at selected intervals adjacent an outer peripheral edge. A cutting blade is provided having a length substantially equivalent to a length, or a width, or a diameter of the container; or to a distance between a pair of cooperating indicia. The cutting blade is adapted to extend from the indicia on one side of the container to the indicia on another side of the container. The cutting member is placed in alignment with the respective indicia and then forced downwardly through the food. The indicia provide a guide to readily align the cutting blade for cutting the food into selected sized portions without having to measure and mark the food prior to cutting.

4 Claims, 2 Drawing Sheets

CONTAINER FOR PRODUCING PREDETERMINED FOOD PORTIONS

CROSS-REFERENCE TO RELATED APPLICATION

This application claims the benefit of U.S. Provisional Patent Application Ser. No. 61/022,430 filed on Jan. 21, 2008.

FIELD OF THE INVENTION

The invention relates to containers, and more specifically to a container for receiving ingredients to be cut into predetermined portions.

BACKGROUND OF THE INVENTION

Many types of foods are prepared and placed into a pan or container and then cut into predetermined portions. A chef or baker typically employs a pan to cook or provide a desired shape to the food being prepared. The completed food is contained within the pan and typically cut into portions prior to serving or storing. Usually, the food contained within the pan is divided into a number of equally sized portions. Equal sized portions facilitate the aesthetic presentation of the food. Additionally, in commercial baking or restaurant operations, consistency in portion size is an essential aspect of meeting customer expectations, controlling the cost of the food sold, and determining the quantity of food that must be prepared.

One method of dividing the food in consistently sized portions is by using a ruler and a knife. The ruler is used to measure the desired portion sizes and mark the upper surface of the food. The ruler is then aligned with the marks and employed as a straight edge to guide the knife as the food is cut. Although this method can be effective, it is a time consuming multi-step process subject to measurement errors and requires a steady hand to evenly cut along the straight edge of the ruler.

Prior art devices such as those illustrated in U.S. Pat. No. 892,552 to Rexer, U.S. Pat. No. 6,009,786 to Hjelden, and U.S. Pat. No. 6,745,660 to Caputo include a guide for a knife or a plurality of cutting blades to facilitate cutting food in equal sized portions. However, these devices typically require a skilled steady hand to cut the equally sized portions; or are a multi-piece device that must be assembled and attached to an associated baking pan.

It would be desirable to have a container and an associated cutting blade for efficiently cutting food within the container into predetermined sized portions.

SUMMARY OF THE INVENTION

Compatible and attuned with the present invention, a container and an associated cutting blade for efficiently cutting food within the container into predetermined sized portions, has surprisingly been discovered.

The above objective, as well as others, may be achieved by bakeware for preparing food comprising a container for receiving ingredients to be separated into predetermined portions; and indicia formed on the container to assist in guiding the vertical movement of a cutting member to form the predetermined portions.

The above objective may also be achieved by bakeware for preparing food comprising a pan having a bottom and a sidewall extending upwardly therefrom terminating at an upper rim including indicia formed adjacent the upper rim; and a cutting member including a cutting edge having a length substantially equivalent to a distance between opposing sides of the sidewall of the pan, the cutting member removably received between opposing sides of the sidewall in alignment with selected indicia to facilitate separating the food into predetermined portions.

The above objective may also be achieved by a method for cutting food into predetermined portions comprising the steps of providing a container having indicia formed thereon for receiving ingredients to be separated into predetermined portions; providing a cutting member having spaced apart lateral edges with a cutting edge formed therebetween for cutting the food; aligning the lateral edges of the cutting member with selected indicia of the container; and forcing the cutting edge downwardly through the food while maintaining the lateral edges of the cutting member in alignment with the selected indicia of the container to substantially cut through the food in a single downward stroke to facilitate forming the predetermined portions.

BRIEF DESCRIPTION OF THE DRAWINGS

The above, as well as other objects and advantages of the invention, will become readily apparent to those skilled in the art from the following detailed description of an embodiment of the invention when considered in the light of the accompanying figures, in which.

DETAILED DESCRIPTION OF AN EMBODIMENT OF THE INVENTION

The following detailed description and appended drawing describe and illustrate an exemplary embodiment of the invention. The description and drawings serve to enable one skilled in the art to make and use the invention, and are not intended to limit the scope of the invention in any manner. In respect of the methods disclosed, the steps presented are exemplary in nature, and the order of the steps is not regarded as necessary or critical.

Figure 1:
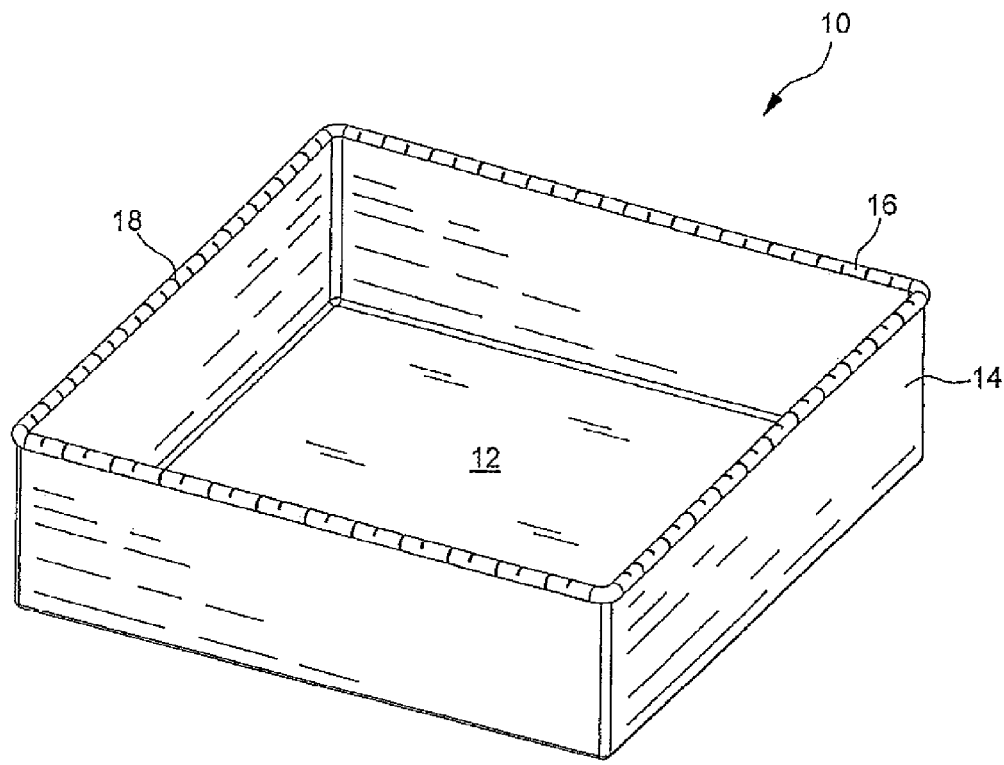
FIG. 1 is a perspective view of a pan according to an embodiment of the invention.

Referring to FIG. 1 there is illustrated a container or a pan, generally indicated by reference numeral 10, for use in preparing food. The pan 10 has a bottom 12 and a peripheral sidewall 14. The sidewall 14 is integral with the bottom 12 and extends upwardly therefrom terminating at an upper rim 16. A plurality of indicia 18 are formed in or marked on the upper rim 16. The indicia 18 are formed at selected intervals wherein each indicium has a cooperating spaced apart indicium on the sidewall 14. The indicia 18 can be color coded, numerically labeled, or otherwise marked to facilitate identifying the cooperating indicia.

In the illustrated embodiment, the bottom 12 of the pan 10 is square. It should be understood that the pan 12 can be formed in other shapes such as rectangular or circular, for example. Additionally, it should be understood that, rather than a pan, a plate or tray can be formed having the indicia 18 formed adjacent a peripheral edge thereof. Further, the indicia 18 can be formed in the sidewall 14 and bottom 12 to extend from the upper rim 16 at a one side of the pan 10 to the upper rim 16 of the opposing side of the pan 10.

Figure 2:
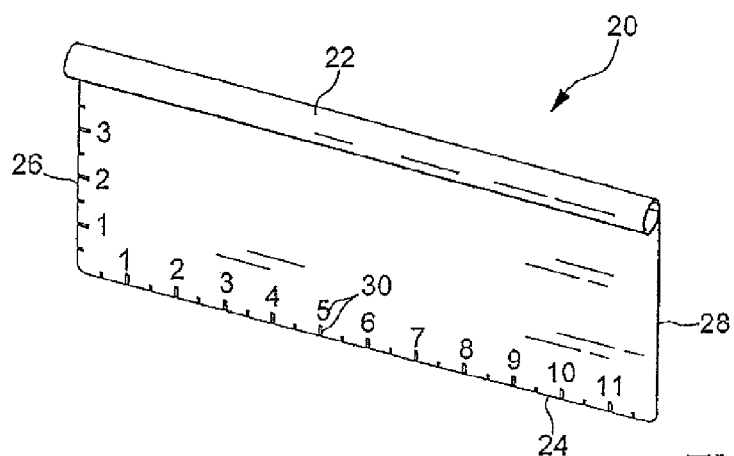
FIG. 2 is a perspective view of a cutting blade adapted for cutting food contained within the pan illustrated in FIG. 1.
Figure 3:
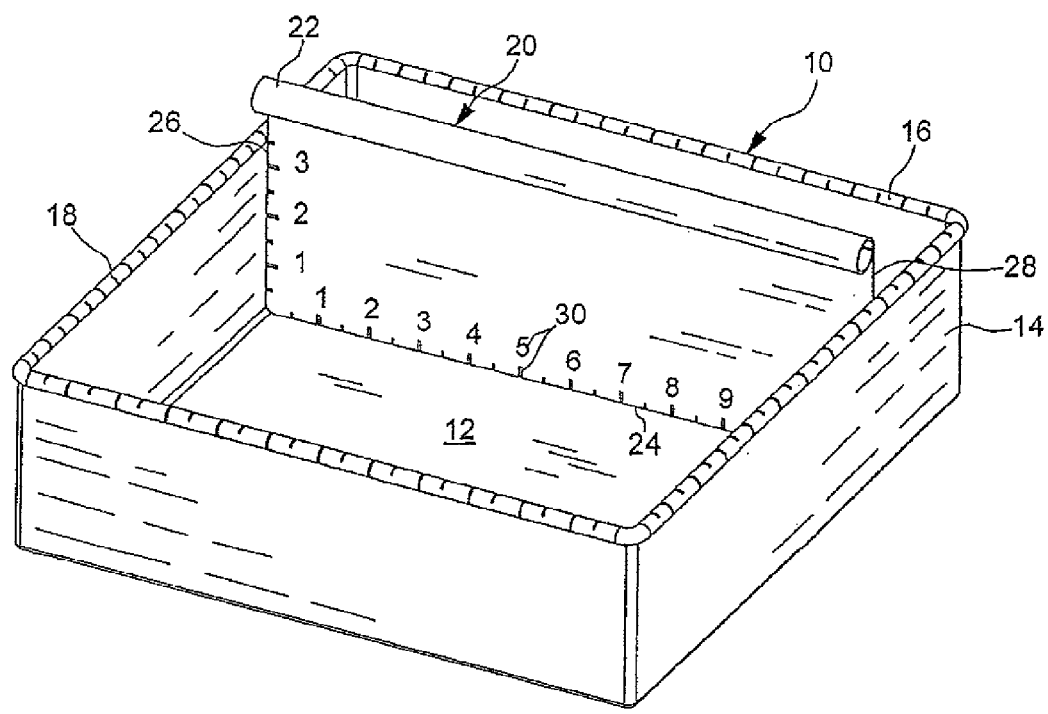
FIG. 3 is a perspective view showing the cutting blade illustrated in FIG. 2 removably received within the pan illustrated in FIG. 1.

Referring now to FIG. 2, there is illustrated a cutting blade, generally indicated by reference numeral 20, adapted to cooperate with the pan 10 to facilitate the cutting of food contained therein into predetermined portions. The cutting blade 20 is provided with a handle 22 at one end, a cutting edge 24 at an opposite end, and spaced apart lateral edges 26, 28. The length of the cutting edge 24 is substantially equivalent to the distance between opposing sides of the sidewall 14 of the pan 10. The cutting edge 24 is adapted to be removably received between opposing sides of the sidewall 14, as illustrated in FIG. 3. Indicia 30 can be formed on the cutting blade 20 adjacent the cutting edge 24 and/or at least one of the lateral edges 26, 28 to facilitate measuring distances and aligning the cutting blade 20 with the indicia 18 formed in the pan 10. The lateral edges 26, 28 of the cutting blade 20 can include means for engaging the upper rim 16 of the pan 10 or the indicia 18 formed therein to facilitate the alignment of the cutting blade 20 with the pan 10. For example, slots can be formed in the cutting blade 20 substantially coextensive with the lateral edges 26, 28 and having an opening at the cutting edge 24 to receive the upper rim 16 and sidewall 14 of the pan 10. In certain instances it is contemplated that the indicia 18 can be a series of grooves or ribs, for example. When the indicia 18 are grooves, the cutting edge 24 can be adapted to be received within the indicia 18 formed on the bottom 12 and the sidewall 14 of the pan 10 to facilitate cutting through the food completely. The indicia 18 can also be utilized to guide the cutting blade 20 when dividing the food into the desired predetermined sized portions.

Favorable results have been obtained by forming the pan 10 from sheet metal and forming a rolled edge at the upper rim 16. It should be understood that other materials may be employed to form the pan such as glass or a plastic having selected thermal properties, for example. Favorable results have been obtained by forming the cutting blade 20 from sheet metal and rolling one end thereof upon itself to form the handle 22 and employing the opposite end as the cutting edge 24. It should be understood that other materials and combinations of materials can be employed to form the cutting blade 20 such as wood for the handle 22 with a metal cutting edge 24 attached thereto, for example. Additionally, it should be understood that the interior surface of the pan 10 and the outer surfaces of the cutting blade 20 can be provided with a non-stick coating such as Teflon®, for example.

In use, a chef or baker prepares a food such as cake, for example, by mixing the necessary ingredients, placing the mixed ingredients in the pan 10, and then baking the ingredients in an oven. Typically, when the ingredients have been baked, the pan 10 containing the cake is removed from the oven, allowed to cool, and then cut into selected sized portions for serving or storage. The cutting blade 20 is employed to facilitate efficiently cutting the selected sized portions.

The chef holds the handle 22 of the cutting blade 20 and aligns the lateral edges 26, 28 thereof with a selected pair of cooperating indicia 18 formed on opposing sides of the upper rim 16 of the pan 10. The chef then forces the cutting blade 10 downwardly through the cake while maintaining the lateral edges 26, 28 thereof in alignment with the selected pair of cooperating indicia 18 to form a cut substantially perpendicular to the sidewall 14 of the pan 10. The cutting process is repeated at selected intervals indicated by the indicia 18 to cut the cake into selected sized portions without having to measure and mark the food prior to cutting.

If the pan 10 has a rectangular shape or some other shape, more than one cutting blade 10 can be employed, each cutting blade 10 having length corresponding to at least one of the distances between opposing sides of the pan 10. Additionally, cutting blades of various lengths can be employed to align between selected indicia 18 to form cuts at selected angles in respect of the sidewall 14.

The pan 10 and cutting blade 20 cooperate to facilitate cutting food into consistent portions of a selected size. A cut can be made across the length of the food with a single downward motion of the cutting blade 20. The single downward cutting motion can be accomplished more quickly and with greater precision as compared to employing a knife to cut along a straight edge. Additionally, by using fixed indicia 18 formed in or marked on the pan 10 to align the cutting blade 20, selected sized portions of the food can be cut without having to measure and mark the food prior to cutting.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method for cutting food into predetermined portions comprising the steps of:

providing a pan for receiving ingredients and for separating a resulting food into predetermined portions during a cutting operation, the pan having a bottom with at least one sidewall extending outwardly therefrom and continuously along an entire periphery of the bottom, the bottom and the at least one sidewall defining an interior surface of the pan, and a portion indicating indicia formed on at least one of the at least one sidewall and the upper rim of the pan to assist in guiding a cutting member to form the predetermined portions, each indicium having a cooperating indicium on an opposing side of the pan, wherein the at least one sidewall surrounds the bottom to form an enclosed container with only an open top;

providing the cutting member having a cutting edge and a pair of lateral edges that together conform in shape to the interior surface of the pan, the cutting member configured to be inserted into the enclosed container through the open top, the cutting edge configured to abut the bottom and the lateral edges configured to abut the at least one sidewall when aligned with the cooperating indicia during the cutting operation;

aligning the lateral edges of the cutting member with selected indicia on the pan; and forcing the cutting edge downwardly through the food while maintaining the lateral edges of the cutting member in alignment with the selected indicia of the container to substantially cut through the food to form the predetermined portions.

2. A bakeware system for preparing food comprising:

a pan for receiving ingredients and for separating a resulting food into predetermined portions during a cutting operation, the pan having a bottom and at least one sidewall extending outwardly therefrom and continuously along an entire periphery of the bottom, the bottom and the at least one sidewall defining an interior surface of the pan, the at least one sidewall terminating at an upper rim, and a portion indicating indicia formed on at least one of the at least one sidewall and the upper rim, each indicium having a cooperating indicium on an opposing side of the pan, wherein the at least one sidewall surrounds the bottom to form an enclosed container with only an open top; and a cutting member having a cutting edge and a pair of lateral edges that together conform in shape to the interior surface of the pan, the cutting member configured to be inserted into the enclosed container through the open top, the cutting edge configured to abut the bottom and the lateral edges configured to abut the at least one sidewall when aligned with the cooperating indicia during the cutting operation.

3. The bakeware system according to claim 2, wherein the indicia are formed at selected intervals.

4. The bakeware system according to claim 2, wherein the cutting member includes indicia formed adjacent the cutting edge.

* * * * *